United States Patent [19]

Haka et al.

[11] Patent Number: 5,445,246
[45] Date of Patent: Aug. 29, 1995

[54] BRAKE BAND MECHANISM

[75] Inventors: Raymond J. Haka; Michael C. Sefcik, both of Brighton, Mich.

[73] Assignee: General Motors Corporation, Detroit, Mich.

[21] Appl. No.: 287,020

[22] Filed: Aug. 8, 1994

[51] Int. Cl.6 .............................. F16D 51/00
[52] U.S. Cl. ............................... 188/77 R
[58] Field of Search ..................... 188/77 R, 77 W

[56]  References Cited
U.S. PATENT DOCUMENTS

| | | | |
|---|---|---|---|
| 2,182,386 | 12/1939 | Patterson | 188/77 R |
| 2,275,142 | 3/1942 | Hale | 188/77 R |
| 3,031,039 | 4/1962 | Goodwin | 188/77 R |
| 3,126,983 | 3/1964 | Huntress | 188/77 R |
| 4,604,914 | 8/1986 | Fisher | 188/77 R |

FOREIGN PATENT DOCUMENTS 518587  7/1976  U.S.S.R. ............ 188/77 R

Primary Examiner—Matthew C. Graham
Attorney, Agent, or Firm—Donald F. Scherer

[57] ABSTRACT

A single wrap brake band mechanism has a hydraulic piston apply structure and an anchor support structure which permit one end of the band to be the apply end and the other end of the band to be the anchor end and vice versa.

6 Claims, 2 Drawing Sheets

BRAKE BAND MECHANISM

BACKGROUND OF THE INVENTION

Band brakes which provide reaction elements in automatic transmissions are either of the single wrap or multiple wrap type. The multiple wrap type band is usually a "double wrap" band, although three or more wraps can be used. The band is self-energizing when the direction of torque is from the anchor end toward the apply end. Under these conditions, the force at the anchor end is greater than the force at the apply end of the band by the ratio of $e^{\mu\theta}$. Thus, the band anchor force is always greater than the apply load, indicating the self-energizing feature.

If the band torque direction is reversed (de-energized), the apply load at the hydraulic piston end will be greater than the band anchor force and the band will not be able to carry as much torque as it did in the energized direction. The self-energizing feature of a single wrap band is a benefit or asset to transmission design since this feature permits the hydraulic energizing force to be maintained at an acceptable value. Bands also have some of the features of a one-way type brake element, that is, on torque reversal the reaction at the braking element is significantly reduced. The single wrap band having a self-energizing and a self-deenergizing direction will greatly reduce the reaction torque on the gear element when the reaction force is reversed from the energizing direction to the deenergizing direction. Thus, the sensitivity to variations in exact time that the band is released is greatly reduced due to the self-deenergizing feature.

If a gear element in an automatic transmission is to be used for two gear ratios (for example, low forward and reverse), having a forward reaction in one ratio and a reverse reaction in the other ratio, a double wrap band is generally used. These devices are not as sensitive to the deenergizing forces as a single wrap band, because they present a larger force ratio between the apply and the anchor end of the band.

A single wrap band can be used to provide reaction force or torque in a planetary set when the reaction torque levels are significantly different between the two gear ratios to be controlled by the reaction member. For example, the reaction torques for an underdrive ratio (i.e. second forward ratio), is significantly greater than the reaction torque for an overdrive ratio (i.e. fourth ratio). The hydraulic system can easily accommodate the force necessary at the band apply end for the overdrive ratio, even though the reaction is in the deenergizing direction. However, upshifting from one overdrive (fourth) to another overdrive (fifth), can require control sophistication that add to the cost and complexity of manufacture. This upshift condition will magnify any errors in the release timing, since the reaction forces are decreasing in the deenergizing direction but will tend to energize the band in the opposite direction as the shift nears completion.

SUMMARY OF THE INVENTION

The present invention permits the use of a single wrap band in transmissions, wherein the same reaction member is utilized for both a low forward ratio and an overdrive ratio, wherein it is necessary to upshift from the overdrive ratio thereby requiring band release. This advantage or improvement is acquired through the use of a band having two apply pistons and two anchor structures which permit either end of the single wrap band to be the apply end with the opposite end being the anchor. Thus, the band can always be operated in the self-energizing direction during an upshift to the band while operating in a deenergizing direction on an upshift from the band.

In one embodiment of the invention, the anchor structures are separate members from the apply piston structure, however, the apply piston structure is a single apply piston in that instance. The other embodiment of the invention has a double apply piston separated by a fixed wall such that the apply piston which is not being hydraulically energized can operate as the anchor end of the band, thus simplifying the mechanical structure while providing a more sophisticated hydraulic structure.

It is therefore an object of this invention to provide an improved band mechanism having a pair of ends which operate as either an apply end or an anchor end, thus permitting both directions of operation to be self-energizing and self-deenergizing.

It is another object of this invention to provide an improved band having spaced ends with an anchor member associated with each end and an apply piston member associated with each end.

It is a further object of this invention to provide an improved band mechanism having a first anchor and piston mechanism for establishing an anchor reaction in one direction of operation and an apply member in the opposite direction of reaction.

It is still another object of this invention to provide an improved band mechanism having a pair of apply piston members, each of which alternatively supply the reaction member for the anchor end of the band.

These and other objects and advantages of the present invention will be more apparent from the following description and drawings.

DESCRIPTION OF THE EXEMPLARY EMBODIMENTS

Figure 1:
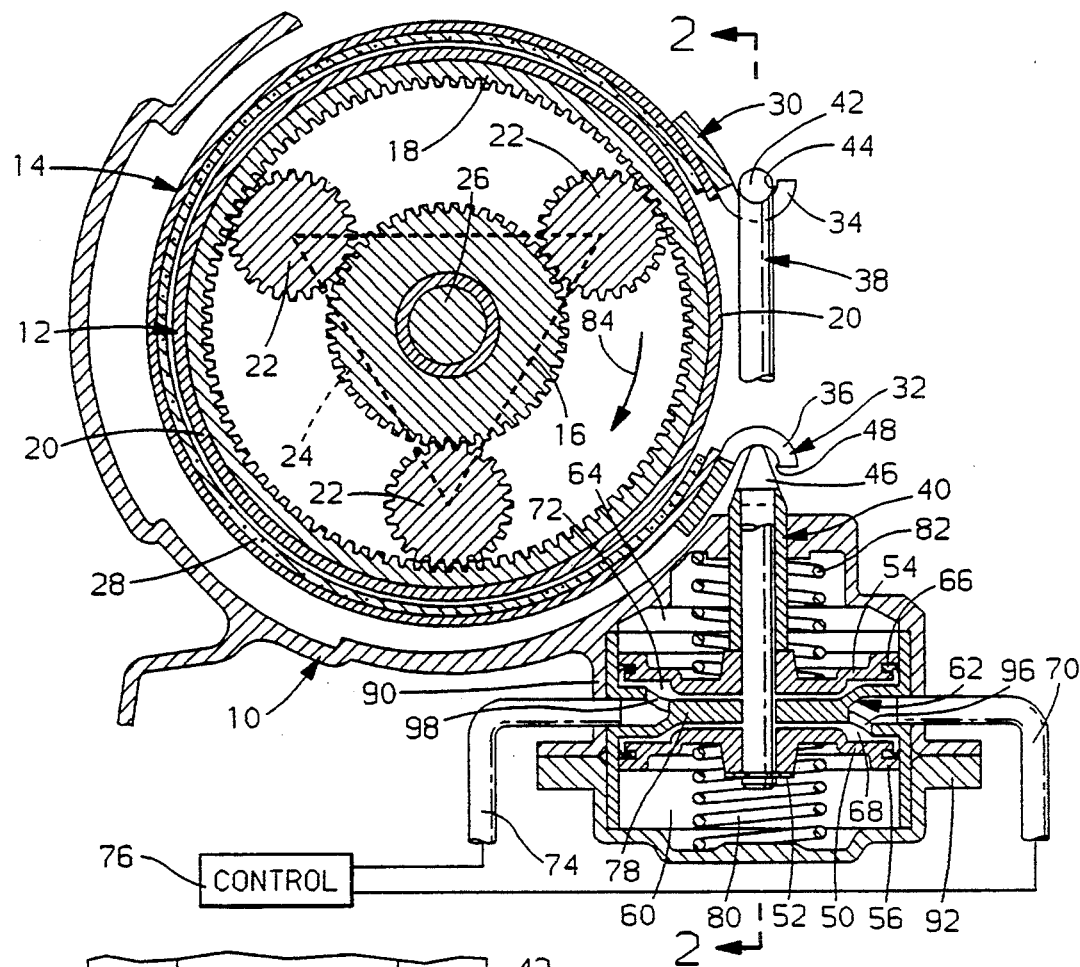
FIG. 1 is a cross-sectional elevational view of a portion of a transmission and band configuration having a single wrap apply mechanism.
Figure 2:
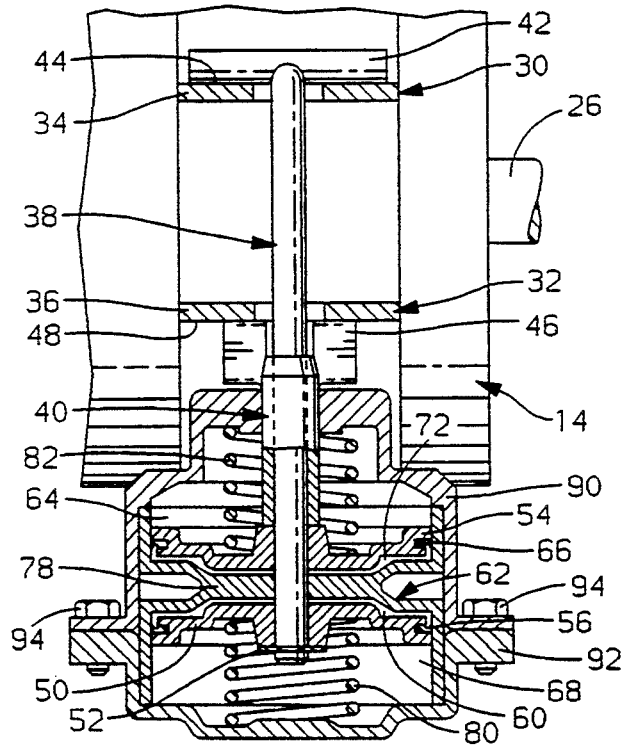
FIG. 2 is a view taken along line 2—2 of FIG. 1.

Referring to FIGS. 1 and 2, there is seen a transmission housing 10 in which is disposed a planetary gear arrangement 12 surrounded by a brake band 14. The planetary gear arrangement 12 includes a sun gear 16, a ring gear 18 secured in a drum 20, a plurality of pinion gears 22 rotatably supported on a carrier 24. The sun gear 16 is rotatably mounted on a shaft member 26.

As is well known with such planetary gear arrangements, the sun 16, carrier 24 or ring gear 18 can be established as a reaction member within the planetary gear unit and any of the other members may be established as an input member by utilizing a direct drive from the shaft 26 or by being clutched to the shaft 26 in a well known manner. With the particular gear arrangement shown, it has been chosen to have the drum 20 directly connected with the ring gear 18. However, as described above, any of the planetary gear members may be connected with the drum 20.

The drum 20 is encircled by the band 14, which includes a friction element 28 having a steel backing portion and a friction fiber portion secured together by a bonding process. The band 14 also includes a pair of end members 30,32, each of which have an anchor end portion 34,36, respectively. The anchor portion 34 is operatively connected with a rod 38 and the anchor portion 36 is operatively connected with a rod 40. The rod 38 has a cross member 42 which seats in a U-shaped recess 44 of the end 34. The rod 40 has an end portion 46 which seats in a U-shaped portion 48 of the end 36.

The rod 38 is slidably disposed through the rod 40 and is operatively connected with a piston 50 by a conventional locking ring 52. The rod 40 is secured through a piston 54. The piston 50 has an annular seal ring 56 disposed in sliding sealing engagement with a chamber portion 60 of a support wall 62. The support wall 62 has another chamber portion 64 which is disposed in sliding sealing abutment with an annular seal 66 secured with the piston 54.

The support wall 62 and piston 50 cooperate to form an apply chamber 68 which is disposed for fluid communication with a hydraulic passage 70. The support wall 62 and piston 54 cooperate to form an apply chamber 72 which is disposed for fluid communication with a hydraulic passage 74. The passages 70 and 74 are in fluid communication with a conventional transmission control 76 which may be of the electro-hydraulic type or mechanical-hydraulic type valving arrangements. Such transmission controls and their function or operation are well known.

The piston 50 is urged toward a central wall portion 78 of the support wall 62 by a spring 80. The piston 54 is urged toward the support wall 62 by a spring 82. The support wall 62 will serve as a structural support or reaction surface for either of the pistons 50 and 54 and accompanying rods 38 and 40, respectively. Also, either piston 50 or 54 may be energized with hydraulic fluid through their respective passages 70 and 74, such that the piston and associated rod members will supply an apply force for the band 14.

The transmission housing 10 has a cup-shaped or chamber portion 90 in which the support wall 62 is disposed, and a cover 92 which also houses a portion of the support wall 62. The cover 92 is secured with the portion 90 by a plurality of fasteners 94 which maintain the assembly of the pistons together with the transmission housing 10.

It should also be appreciated that the support wall 62, as viewed in FIG. 1, has an opening or passage 96 which communicates the passage 70 with the chamber 68 and an opening or passage 98 which communicates the passage 74 with the chamber 72.

When the passage 70 is energized, the piston 50 will be urged downward against the force of spring 80, as seen in FIGS. 1 and 2, to draw the band 14 tightly around the drum 20. When the piston 50 is energized or hydraulically pressurized, it is presumed the reaction torque on the drum 20 will be in the direction of torque reaction arrow 84. Thus, the reaction force will attempt to cause the anchor end 36 to seat strongly against the end portion 46 thereby urging the piston 54 into seating abutment with the wall 78. Thus, the piston 54 and its associated rod will become the anchor for the band 14. As is well known, the force at the anchor end will be possibly twice the force at the apply end, and the associated reaction torque will attempt to further energize the band 14 into engagement with the drum 20.

When the passage 74 is energized, the piston 54 and associated rod 40 will be urged upwardly by fluid pressure in chamber 72 against the spring 82 to urge the anchor end 36 to enforce engagement between the band 14 and the drum 20. In this instance, it is presumed the reaction torque is in a direction opposite to the arrow 84, such that the end 30 of the band 14 will become the anchor end resulting again in a self-energizing band. Thus, it should be apparent at this point that the band can be made self-energizing in either direction of torque reaction, depending upon the apply chamber which is energized or pressurized.

Presuming the band has been activated by hydraulic pressure in the chamber 68, such that the piston 50 is the apply piston and that the end 32 is the anchor end, and it is desirable now to disengage the band, the torque reaction 84 will, due to the action of planetary gears, reverse direction, thereby causing the reaction input force to occur at end 30. This force will tend to deenergize the band and further relieve the action of the piston 50.

When the band is energized through fluid pressure in the chamber 72, and it is desired to upshift the transmission which will result in a reaction reversal, the band will also become deenergized when the torque reversal occurs.

Figure 3:
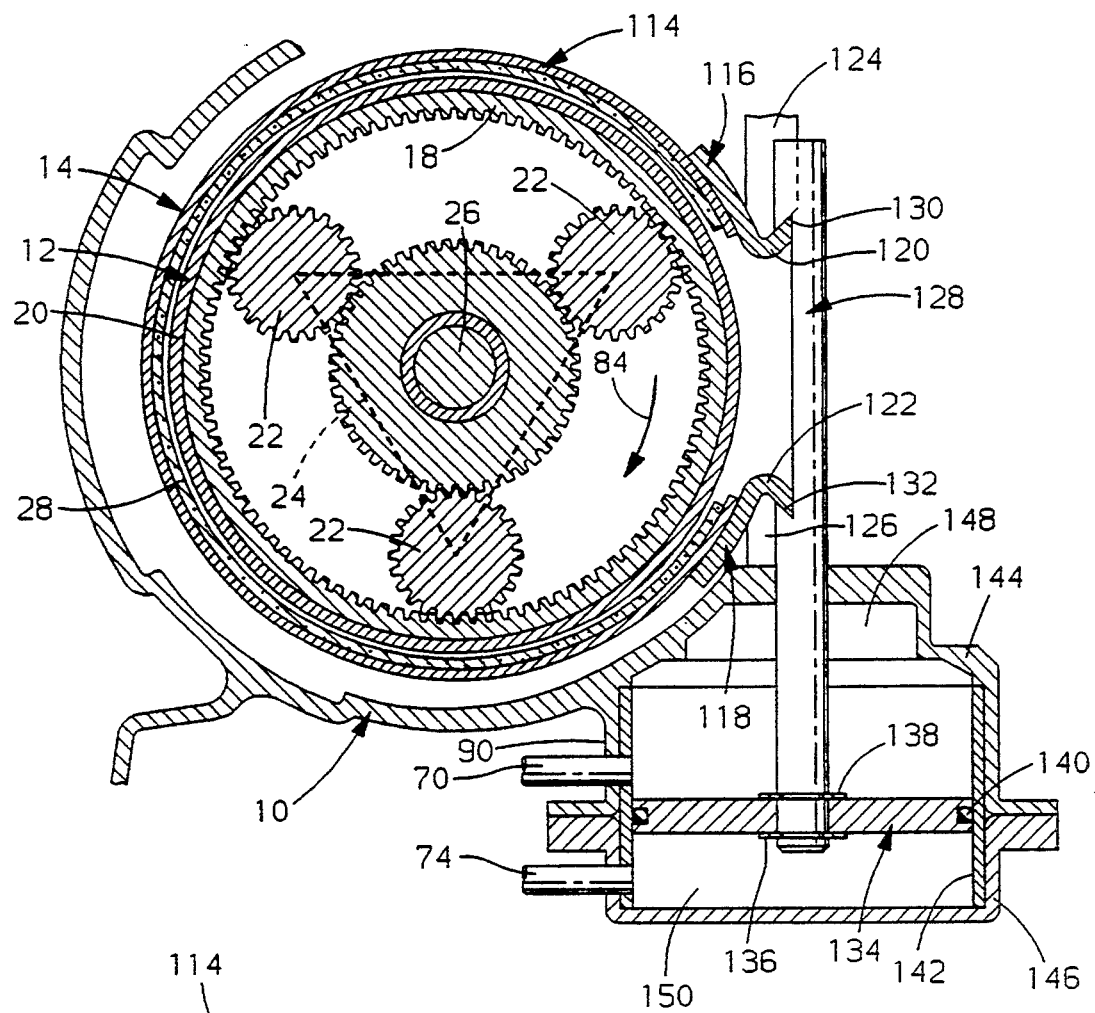
FIG. 3 is another embodiment of the single wrap band mechanism having dual anchor structures and a single apply piston structure.
Figure 4:
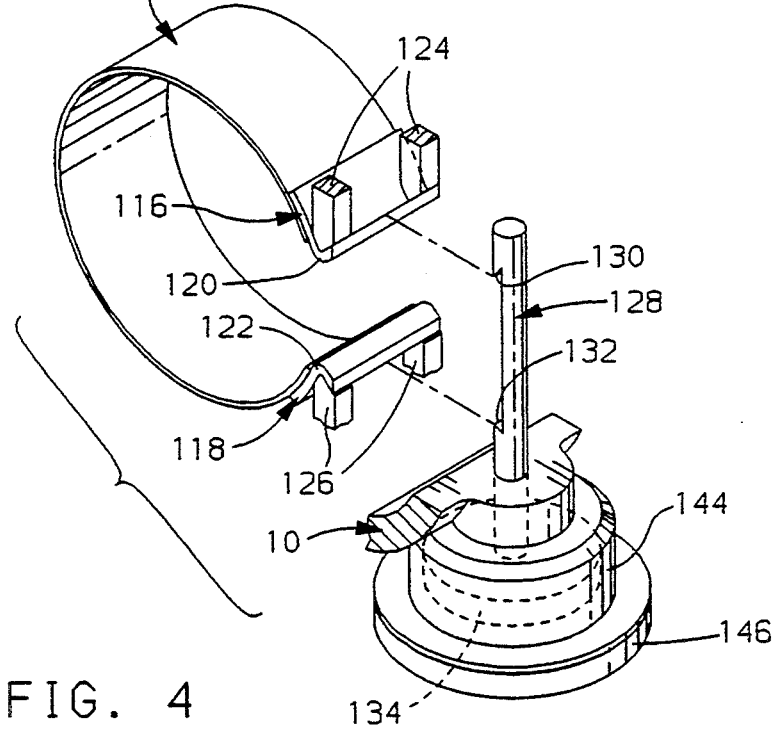
FIG. 4 is an exploded isometric view of the embodiment described in FIG. 3.

A band and apply piston structure, shown in FIGS. 3 and 4, includes a band 114 which is essentially the same as the band structure described for band 14 in FIG. 1. The band 114 has a pair of ends 116,118, each of which have an anchor portion 120,122, respectively. The anchor portion 120 is disposed for abutment with a pair of rigid supports 124 which are secured in the transmission housing 10. The anchor 122 is adapted for abutment with a pair of rigid supports 126 which are also secured in the housing 10. Thus, each of the anchor ends 120 and 122 have a rigid support structure which does not move relative to the housing 10. Each end 116 and 118 is also operatively associated with a piston rod 128 which has spaced V-notches 130 and 132 adapted to engage the ends of anchors 120 and 122, respectively.

The rod 128 is secured to a piston 134 by a pair of lock rings 136,138. The piston 134 has an annular seal 140 which is slidably disposed in sealing engagement with a housing liner 142. The housing liner 142 is disposed in a housing portion 144 formed as a portion of housing 10 and an end cover 146. The housing portion 144 and piston 134 cooperate to form an apply chamber 148 and the piston 134 and cover 146 cooperate to form an apply chamber 150. The apply chamber 150 is disposed in fluid communication with the passage 74 and the chamber 148 is disposed in fluid communication with the passage 70.

When the passage 70 is energized or pressurized from the control 76, the end 116 of band 114 becomes the apply end and the end 118 becomes the anchor end. Assuming the torque reaction is in the direction of the arrow 84, the band will be self-energizing in the apply direction and deenergizing in the release direction. Should the passage 74 be energized, the end 118 will become the apply end while the end 116 becomes the anchor end and, if the torque reaction is in a direction opposite to arrow 84, the band will again be self-energizing in the apply direction and deenergizing in the release direction.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A brake band mechanism comprising:
   a brake drum;
   a brake band encircling at least a portion of the drum and presenting first and second spaced ends each having an anchor section;
   rod means for engaging said spaced ends;
   first apply piston means including said rod means operatively connected with the anchor section of the first spaced end to selectively independently enforce engagement of the brake band with the brake drum; and
   second apply piston means including said rod means and being disposed coaxial with the first apply piston means and operatively connected with the anchor section of the second spaced end to selectively independently enforce engagement of the brake band with the brake drum.

2. The brake band mechanism defined in claim 1, further comprising control means for energizing said first and second apply piston means only nonsimultaneously.

3. The brake band mechanism defined in claim 1 including:
   means for energizing said second apply piston means;
   means for maintaining said first spaced anchor section stationary when said second apply piston means is energized;
   means for energizing said first piston apply means; and
   means for maintaining said second spaced anchor section stationary when said first piston apply means is energized.

4. The brake band mechanism defined in claim 1, wherein said first piston apply means is effective to hold said first spaced anchor section stationary when said second apply piston means enforces engagement of the brake band; and
   said second apply piston means is effective to hold said second spaced anchor end stationary when said first apply piston means enforces engagement of the brake band.

5. A brake band mechanism comprising:
   a brake drum having a circumferential portion;
   a brake band encircling less than the full circumferential portion of the drum and presenting first and second spaced ends;
   a pair of coaxial and concentric rod means for selectively operatively engaging said first and second spaced ends;
   first and second coaxial pistons selectively operable independently and nonsimultaneously to enforce respective ones of said rod means to engage said first and second ends respectively for independently energizing said brake band to engage said brake drum.

6. The brake band mechanism defined in claim 5, wherein one of said rod means and said first piston are effective to maintain the first spaced end stationary when said second piston and said other rod means are operated to energize said brake band; and
   said other rod means and said second piston are effective to maintain the second spaced end stationary when said first piston and said one rod means are operated to energize said brake band.

* * * * *